United States Patent [19]

Beach

[11] 3,961,128

[45] June 1, 1976

[54] COMPOSITION FOR FILLING CABLES

[75] Inventor: Shirley Beach, North Vancouver, Canada

[73] Assignee: Phillips Cables Limited, Brockville, Canada

[22] Filed: Dec. 27, 1973

[21] Appl. No.: 428,757

[30] Foreign Application Priority Data

Dec. 29, 1972 Canada ................................ 160290

[52] U.S. Cl. .............................. 174/23 C; 106/272; 174/107

[51] Int. Cl.[2] .......................................... H02G 15/20

[58] Field of Search ................ 174/23 C, 23 R, 116, 174/107, 25 R, 25 C; 252/59, 63, 63.2, 316; 156/48; 208/20, 21; 106/270, 272; 260/28

[56] References Cited

UNITED STATES PATENTS

| | | | |
|---|---|---|---|
| 2,746,875 | 5/1956 | Mills | 106/272 |
| 3,271,177 | 9/1966 | Rumberger | 106/272 |
| 3,607,332 | 9/1971 | Wingfield | 106/272 |
| 3,683,104 | 8/1972 | Woodland et al. | 174/107 X |
| 3,775,548 | 11/1973 | Zinser, Jr. et al. | 174/23 C |

FOREIGN PATENTS OR APPLICATIONS

| | | | |
|---|---|---|---|
| 2,019,074 | 11/1971 | Germany | 174/23 C |
| 2,018,863 | 10/1971 | Germany | 174/23 C |

*Primary Examiner*—Arthur T. Grimley
*Attorney, Agent, or Firm*—Diller, Brown, Ramik & Wight

[57] ABSTRACT

A composition useful for filling communication cables is described which comprises petroleum jelly and a small amount of siliceous material which renders the petroleum jelly viscous at elevated temperatures, and prevents leakage of the petroleum jelly from a cable having a flaw, which is subjected to elevated temperatures.

21 Claims, 2 Drawing Figures

COMPOSITION FOR FILLING CABLES

BACKGROUND OF THE INVENTION

1. Field of the Invention

This invention relates to a composition for filling telecommunications cables, a communication cable containing the composition, a method of making the composition and a method of making a communication cable.

2. Description of Prior Art

Communication cables generally comprise a plurality of conductors which may or may not be individually or collectively insulated and which may or may not include a core, enclosed within a waterproof sheath; the interstices between the conductors and between the conductors and the sheath being filled from end to end of the cable length with a water-impervious medium. The water-impervious medium should not drain under the influence of gravity or such hydrostatic pressure as may arise in the event of damage to the cable sheath, as this would leave an incompletely filled cable along which moisture might travel and the medium should further permit relative sliding movement of the conductors over one another during such bending of the cables as occurs during manufacture and installation of the cable.

A preferred water-impervious medium is petroleum jelly, however, petroleum jelly has a tendency to seep from the cable ends or from a flaw developed in the cable, at elevated temperatures to which the cable might be subjected in installation or in use particularly in warm climates.

Various attempts have been made to overcome this disadvantage of petroleum jelly. Compositions comprising petroleum jelly with the addition of micro-crystalline waxes and low molecular weight polyethylene resin have partially solved the problem, by rendering the petroleum jelly firm at room temperatures of the order of 20°C; and reducing the mobility of the petroleum jelly at higher temperatures of the 70°C sufficiently to prevent any substantial seepage of the petroleum jelly from the cable.

These compositions, however, are not entirely successful because the petroleum jelly and the wax and resin are not entirely compatible and there is a tendency for them to separate, particularly during the filling process which may involve sustained high temperatures accompanied by mechanical shearing.

It is an object of the present invention to provide a composition suitable for filling telecommunication cables which will overcome the aforementioned problems.

IT is a further object to provide telecommunication cables containing the composition.

It is a further object of the invention to provide a method of making a composition which will overcome the aforementioned problems.

It is a further object of the invention to provide a method of making a telecommunication cable containing the composition.

SUMMARY OF THE INVENTION

It has now been found that the addition of a small amount of siliceous material such as diatomaceous earth to a petroleum jelly produces a stable composition suitable for filling communication cables, which satisfies the seepage requirements of such cables.

Siliceous materials such as diatomaceous earth are compatible with the petroleum jelly and increase the viscosity of the petroleum jelly at high temperatures. Siliceous materials have the further advantages that they are relatively inert, they are very poor conductors of electricity and they do not disturb the electrical properties of the petroleum jelly.

As a further point it is found that the small amount of siliceous material does not significantly alter the viscosity of petroleum jelly at room temperatures and lower temperatures so that the presence of the diatomaceous earth does not render the petroleum jelly brittle at low temperatures; this is significant inasmuch as the cable may be used in areas which are subject to extremes of temperature conditions.

According to the invention a composition for filling communication cables comprises petroleum jelly and siliceous material in an amount effective to render the petroleum jelly viscous at elevated temperatures, the siliceous material being substantially uniformly distributed throughout the petroleum jelly.

According to another aspect of the invention a communication cable comprises a plurality of conductors enclosed within a sheath; interstices between individual conductors and between the conductors and the sheath being filled with a composition comprising petroleum jelly and siliceous material in an amount effective to render the petroleum jelly viscous at elevated temperatures, the siliceous material being substantially uniformly distributed throughout the petroleum jelly.

According to another aspect of the invention a method of making a composition for filling communication cables comprises mixing siliceous material with a liquid vehicle compatible with petroleum jelly to form a concentrate of siliceous material in said vehicle, adding said concentrate to petroleum jelly in an amount to provide an amount of siliceous material effective to render the petroleum jelly viscous at elevated temperatures, and mixing to uniformly distribute said siliceous material in said petroleum jelly.

According to another aspect of the invention in a method of making a communication cable the improvement comprises providing a plurality of conductors surrounded by a sheath and filling the interstices between individual conductors and between the conductors and the sheath with a composition comprising petroleum jelly and siliceous material in an amount effective to render to petroleum jelly viscous at elevated temperatures, the siliceous material being uniformly distributed throughout the petroleum jelly.

In this specification, petroleum jelly includes synthetic petroleum jelly, and naturally occurring petroleum jelly and mixtures of the two.

Synthetic petroleum jelly is well known and is generally obtained by mixing various heavy petroleum lubricating oils with a low melting point paraffin wax.

Naturally occurring petroleum jelly is well known and is generally defined as comprising a purified mixture of semi-solid hydrocarbons obtained by the distillation of high boiling petroleum fractions and having a density in the range of about 0.81 to 0.88 at 60°C and a melting point of between 38' and 60°C as derived by fractional distillation of still residues from the steam distillation of parrafin-base petroleum, or from steam-reduced amber crude oils; the latter being oils from which the light fractions have been removed.

Siliceous material in this specification includes, diatomaceous earth, colloidal silica, pyrogenic silica and silica aerogel and similar silica containing siliceous materials having a relatively large surface area to mass ratio.

By way of example one suitable siliceous material is that sold under the trademark CAB-O-SIL by the Cabot Corporation. CAB-O-SIL is defined as a colloidal silica consisting of submicroscopic particles averaging in diameter by grade from 70 to 140 angstroms, sintered together in chain-like formations, the chains being branched and having surface areas of $50m^2/g$ to $400m^2/g$ depending on the grade. Grades having surface areas of $200m^2/g$ to $400m^2/g$ are preferred.

The amount of siliceous material added to the petroleum jelly should be effective to render the petroleum jelly viscous at elevated temperatures at which the petroleum jelly otherwise be fluid. The elevated temperatures envisaged would not generally be higher than about 85°C and for most purposes an amount of siliceous material effective to render the petroleum jelly viscous at 80°C is satisfactory.

An amount of siliceous material of the order of about 2% volume to 4% by volume of the petroleum jelly has provided satisfactory viscosity in petroleum jelly at 80°C.

It is found to be convenient to measure the quantities by volume rather than by weight, however, on a weight basis a suitable amount of siliceous material would be 1 to 6% by weight based on the weight of the petroleum jelly.

In the cable according to the invention the sheath is suitably an aluminium tape which is preferably applied longitudinally or helically about the plurality of conductors such that contiguous margins overlap and can be bonded together. The individual conductors are preferably insulated by coating them with a plastics material preferably of cellular form, for example, cellular polyethylene or cellular polypropylene.

The interstices between the individual conductors and between the conductors and the sheath may be filled with the composition before the edges of the sheath are bonded together.

The aluminium sheath provides an electrical shield for the conductors and is impervious to petroleum jelly. A jacket of polyethylene or polypropylene may be extruded around the aluminium sheath in a conventional manner as desired.

The sheath could also comprise other material for example polyethylene tape, however, this has the disadvantage of being pervious to the petroleum jelly and the possibility exists of the composition migrating in certain conditions into and under the polyethylene sheath, thus creating an incompletely filled cable along which moisture may travel.

The invention thus provides a fully filled communication cable whose interstices are filled with a water-impermeable medium consisting of, or including as a major constituent, petroleum jelly which has a sufficiently low resistance to flow at the temperatures to which it will be subjected during manufacture of the cable to permit pumping and application of the medium to a cable core without any substantial degradation of the medium and which has a sufficiently high resistance to flow at the temperatures to which the cable will be subjected during service to ensure that the medium will not drain under the influence of gravity or such hydrostatic pressure as may arise in service or in the event of damage to the cable sheath.

The invention further provides such a cable in which the water-impermeable medium consisting of, or including as a major constituent, petroleum jelly, is of a nature such that it will be retained in the cable core during the application of a longitudinally applied screen or water barrier, for example a plastics-coated metal foil "Glover barrier," to the extent that it will not contaminate the seam of the screen.

According to one aspect of the invention the interstices between the insulated conductors and between them and the waterproof sheath or, in the case of a unit-type cable, the interstices between the insulated conductors of each group of conductors and between the insulated conductors of each group and a water-impermeable covering of the group, from end to end of the cable length, are filled with a water-impermeable medium consisting of, or including as a major constituent, petroleum jelly and substantially uniformly distributed throughout the petroleum jelly, particulate siliceous material in an amount sufficient to render the petroleum jelly highly resistant to flow at the temperatures to which the cable will normally be subjected during service.

The waterproof sheath may be of a metallic nature or of plastics material and may take any convenient form but it preferably comprises an extruded body of plastics material. Between the core of insulated conductors and the waterproof sheath there may be provided a screen or water barrier comprising a longitudinally applied metallic tape which is folded transversely about the core with an overlapped seam. Preferably one or each major surface of the metallic tape is coated with a plastics material and the metallic tape is so applied to the core that its outermost surface is plastics coated and is bonded to the extruded plastics sheath.

The composition of the invention may optionally include additives conventionally used in cable filling compositions for example, oxidation inhibitors, e.g., phenyl-$\beta$-naphthylamine and metal deactivators, e.g., NN'-disalicylidene ethylene diamine. Suitable amounts of such compounds are up to 0.2% by weight of the composition of the oxidation inhibitor and up to 0.02% by weight of the composition of the metal deactivator.

In the method of the invention for preparing the composition, the well known masterbatch technique is found to be suitable. In this technique the siliceous material is subjected to an intensive mixing, preferably in an Ink Mill or Ball Mill, with a liquid vehicle having high surfactant or wetting properties and which is compatible with the petroleum jelly.

The intensive mixing produces a concentrate which is then mixed into the petroleum jelly to produce a composition in which the siliceous material is uniformly distributed throughout the composition.

A suitable liquid vehicle is polybutene, however, other liquid vehicles having the requisite wetting and compatibility properties can also be used. Suitably the siliceous material is added to polybutene in an amount of about 30 parts by weight siliceous material to 70 parts by weight polybutene.

While the preparation of the compositions has been described with reference to the preferred method, wherein a concentrate of siliceous material in a liquid vehicle is formed for addition to the petroleum jelly, it will be appreciated that the siliceous material could be added directly to the petroleum jelly without the aid of the liquid vehicle or the petroleum jelly itself could be used as the liquid vehicle.

In the method of making the communication cable the compositions may be introduced into the cable by a vacuum impregnation process as a final step in the manufacture of the cable. Generally, however, it is preferred to introduce the composition as the cable is being manufactured, for example, as a step preceding or immediately following the application of each layer of conductors or pairs of quads to the underlying assembly of conductors, pairs or quads. In the latter case, the composition of the invention may be introduced into the cable at a die, which is modified to provide an annular space allowing the material to flow completely around each layer of conductors. Excess compositions may be removed by a snuggering die and an insulating tape, for example, of paper, may be wound around the outer layer of conductors.

In another embodiment pairs of conductors, preferably insulated, may be passed into a flooding tank into which the composition of the invention is pumped; the composition is thus applied to each of the conductors as they twist about each other more closely. The conductors then pass into a wiping die that compresses the hitherto slightly separated, but composition covered conductors and removes excessive composition from the conductors. A sheath may then be wrapped about the conductors.

BRIEF DESCRIPTION OF DRAWINGS

The invention is illustrated with reference to the accompanying drawings, in which.

DESCRIPTION OF PREFERRED EMBODIMENTS

Figure 1:
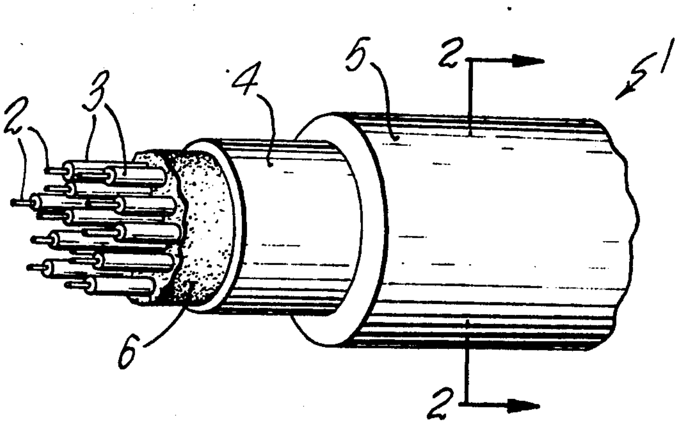
FIG. 1 schematically represents a communication cable part cut away.
Figure 2:
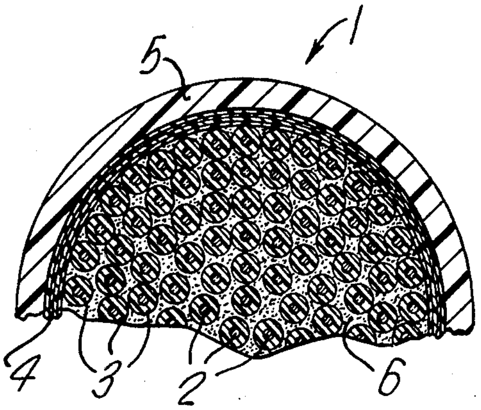
FIG. 2 is an exploded cross-section part cut away on line 2—2 of FIG. 1.

With reference to the drawing a communication cable 1 comprises a plurality of copper conductors 2 each having an insulating coating 3 of polyethylene which maay be cellular in form. A sheath 4 of aluminium tape is wrapped longitudinally about the conductors 2 to form a complete envelope; and an extruded jacket 5 of polyethylene surrounds the sheath 4.

The interstices between the individual insulated conductors 2 and between the conductors 2 and the sheath 4 are filled throughout the length of the cable 1 with the water-impermeable medium 6, consisting of petroleum jelly containing 3% volume by volume of the petroleum jelly of diatomaceous earth thoroughly disbursed therein.

If required, the cable 1 may be provided with armouring (not shown) and protected against corrosion by an extruded over-sheath of for example, polyvinyl chloride.

EXAMPLES

Example 1

A colloidal silica available under the trademark CAB-O-SIL was intensively mixed with polybutene (M.W. 400 to 1000 on the MECROLAB SCALE) in an amount of 30 parts by weight of CAB-O-SIL to 70 parts by weight of the polybutene in an Ink Mill to produce a concentrate. The resulting concentrate was added to petroleum jelly to provide 2% volume of CAB-O-SIL in the petroleum jelly and was intensively mixed therein to uniformly distribute the CAB-O-SIL throughout the petroleum jelly.

The resulting composition was used as a filler for a communication cable and no seepage occurred when the cable was subjected to heating to a temperature of 80°C.

EXAMPLE 2

CAB-O-SIL colloidal silica was added directly to petroleum jelly in an amount of 3% volume by volume of the petroleum jelly. The petroleum jelly with the CAB-O-SIL was subjected to an intensive mixing to distribute the CAB-O-SIL uniformly throughout the petroleum jelly.

The resulting composition was used as a filler for a communication cable and no seepage occurred when the cable was subjected to heating to a temperature of 80°C.

I claim:

1. A communication cable comprising a plurality of conductors enclosed within a sheath; interstices between individual conductors and between the conductors and the sheath being filled with a composition comprising petroleum jelly and siliceous material in an amount effective to render the petroleum jelly viscous at elevated temperatures, the siliceous material having a relatively large surface area to mass ratio and being substantially uniformly distributed throughout the petroleum jelly.

2. A communication cable according to claim 1, wherein said composition consists essentially of 99 to 94% by weight of petroleum jelly and 1 to 6% by weight of siliceous material.

3. A communication cable according to claim 1, wherein the amount of siliceous material is effective to render the petroleum jelly composition viscous at a temperature of about 80°C whereby when the composition is used as a filler in a communication cable, substantially no seepage occurs when the cable is heated to a temperature of about 80°C.

4. A communication cable according to claim 1, wherein the amount of siliceous material is 2% volume to 4% volume based on the volume of the petroleum jelly.

5. A communication cable according to claim 1, wherein said composition comprises a liquid vehicle for the siliceous material, compatible with the petroleum jelly.

6. A communication cable according to claim 5, wherein said liquid vehicle is polybutene.

7. A communication cable according to claim 5, wherein the siliceous material and liquid vehicle are present in a ratio of about 30 parts by weight of siliceous material to 70 parts by weight of said liquid vehicle.

8. A communication cable according to claim 1, wherein said siliceous material consists of submicroscopic particles having an average diameter in the range of about 70 to 140 angstroms, sintered together in a branched chain-like formation, and having a surface area in the range of about 200 $m^2/g$ to 400 $m^2/g$.

9. A communication cable according to claim 1, wherein said conductors are individually insulated conductors.

10. A communication cable according to claim 1, wherein said sheath comprises an aluminium tape.

11. A communication cable according to claim 1, further including a jacket of insulating material around said sheath.

12. A telecommunication cable comprising a multiplicity of plastics insulated conductors, a waterproof sheath enclosing the insulated conductors and, filling the interstices between these insulated conductors and between them and the waterproof sheath or, in the case of a unit-type cable filling the interstices between insulated conductors of each group of conductors and between the insulated conductors of each group and a water-impermeable covering of the group, from end to end of the cable lenght, a water-impermeable medium consisting of, or including as a major constituent, petroleum jelly and, substantially uniformly distributed throughout the petroleum jelly, particulate siliceous material having a relatively large surface area to mass ratio, in an amount sufficient to render the petroleum jelly highly resistant to flow at the temperatures to which the cable will normally be subjected during service.

13. A telecommunication cable comprising a multiplicity of plastics insulated conductors, a waterproof sheath enclosing the insulated conductors and between them and the waterproof sheath or, in the case of a unit-type cable, filling the interstices between the insulated conductors of each group of conductors and a water-impermeable covering of the group, from end to end of the cable length, a water-impermeable medium consisting of, or including as a major constituent, petroleum jelly and, substantially uniformly distributed throughout the petroleum jelly, particulate colloidal silica in an amount sufficient to render the petroleum jelly highly resistant to flow at the temperatures to which the cable will normally be subjected during service.

14. A telecommunication cable comprising a multiplicity of plastics insulated conductors, a waterproof sheath enclosing the insulated conductors and, filling the interstices between these insulated conductors and between them and the waterproof sheath, or, in the case of a unit-type cable, filling the interstices between the insulated conductors of each group of conductors and between the insulated conductors of each group and a water-impermeable covering of the group, from end to end of the cable length, a water-impermeable medium consisting of, or including as a major constituent, petroleum jelly and, substantially uniformly distributed throughout the petroleum jelly, particulate siliceous material having a relatively large surface area to mass ratio, in an amount of 1% – 6% by weight.

15. A communication cable according to claim 9 wherein said conductors are individually insulated with an insulating coating in cellular form.

16. A communication cable according to claim 15 wherein said insulating coating is cellular polyethylene.

17. A communication cable according to claim 16 wherein said siliceous material consists of submicroscopic particles having an average diameter in the range of about 70 to 140 angstroms, sintered together in a branched chain-like formation, and having a surface area in the range of about 200 $m^2/g$ to 400 $m^2/g$; and the amount of siliceous material is 2% volume to 4% volume based on the volume of the petroleum jelly.

18. A telecommunication cable according to claim 13 wherein the plastics insulations of said plastics insulated conductors is cellular polyethylene or cellular polypropylene.

19. A telecommunication cable according to claim 14 wherein the plastics insulation of said plastics insulated conductors is cellular polyethylene or cellular polypropylene.

20. A telecommunication cable according to claim 19 wherein said siliceous material consists of submicroscopic particles having an average diameter in the range of about 70 to 140 angstroms, sintered together in a branched chain-like formation, and having a surface area in the range of about 200 $m^2/g$ to 400 $m^2/g$.

21. A telecommunication cable according to claim 12 wherein the plastics insulation of said plastics insulated conductors is cellular.

* * * * *